United States Patent
Minassian

(10) Patent No.: US 11,836,277 B2
(45) Date of Patent: *Dec. 5, 2023

(54) SECURE CIRCUIT INTEGRATED WITH MEMORY LAYER

(71) Applicant: CROSSBAR, INC.

(72) Inventor: George Minassian, Santa Clara, CA (US)

(73) Assignee: CROSSBAR, INC., Santa Clara, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 17/354,634

(22) Filed: Jun. 22, 2021

(65) Prior Publication Data

US 2021/0342488 A1    Nov. 4, 2021

Related U.S. Application Data

(63) Continuation of application No. 13/673,951, filed on Nov. 9, 2012, now Pat. No. 11,068,620.

(51) Int. Cl.
*G06F 21/74*    (2013.01)

(52) U.S. Cl.
CPC ...... *G06F 21/74* (2013.01); *G06F 2221/2123* (2013.01)

(58) Field of Classification Search
CPC .. G06F 21/74; G06F 2221/2123; G06F 21/72; G06F 21/79; G06F 21/71; G06F 21/77; G06F 21/76; G06F 3/0679; G06F 3/0688
See application file for complete search history.

(56) References Cited

U.S. PATENT DOCUMENTS

| | | | |
|---|---|---|---|
| 680,652 | A | 8/1901 | Elden |
| 4,433,468 | A | 2/1984 | Kawamata |
| 4,684,972 | A | 8/1987 | Owen et al. |
| 4,741,601 | A | 5/1988 | Saito |
| 5,139,911 | A | 8/1992 | Yagi et al. |
| 5,242,655 | A | 9/1993 | Oguro |
| 5,278,085 | A | 1/1994 | Maddox, III et al. |
| 5,315,131 | A | 5/1994 | Kishimoto et al. |
| 5,335,219 | A | 8/1994 | Ovshinsky et al. |

(Continued)

FOREIGN PATENT DOCUMENTS

| | | |
|---|---|---|
| CN | 101208705 A | 6/2008 |
| CN | 101740111 A | 6/2010 |

(Continued)

OTHER PUBLICATIONS

Notice of Allowance for U.S. Appl. No. 13/673,951 dated Mar. 23, 2021, 7 pages.

(Continued)

*Primary Examiner* — Ali S Abyaneh
(74) *Attorney, Agent, or Firm* — WEGMAN, HESSLER, VALORE

(57) ABSTRACT

A secure integrated circuit comprises a lower logic layer, and one or more memory layers disposed above the lower logic layer. A security key is provided in one or more of the memory layers for unlocking the logic layer. A plurality of connectors are provided between the one or more memory layers and the lower logic layer to electrically couple the memory layer(s) and lower logic layer.

20 Claims, 8 Drawing Sheets

(56) References Cited

U.S. PATENT DOCUMENTS

| | | |
|---|---|---|
| 5,360,981 A | 11/1994 | Owen et al. |
| 5,457,649 A | 10/1995 | Eichman et al. |
| 5,538,564 A | 7/1996 | Kaschmitter |
| 5,541,869 A | 7/1996 | Rose et al. |
| 5,594,363 A | 1/1997 | Freeman et al. |
| 5,614,756 A | 3/1997 | Forouhi et al. |
| 5,645,628 A | 7/1997 | Endo et al. |
| 5,714,416 A | 2/1998 | Eichman et al. |
| 5,751,012 A | 5/1998 | Wolstenholme et al. |
| 5,840,608 A | 11/1998 | Chang |
| 5,970,332 A | 10/1999 | Pruijmboom et al. |
| 5,998,244 A | 12/1999 | Wolstenholme et al. |
| 6,128,214 A | 10/2000 | Kuekes et al. |
| 6,143,642 A | 11/2000 | Sur, Jr. et al. |
| 6,259,116 B1 | 7/2001 | Shannon |
| 6,291,836 B1 | 9/2001 | Kramer et al. |
| 6,436,706 B1 | 8/2002 | Ward et al. |
| 6,436,818 B1 | 8/2002 | Hu et al. |
| 6,492,694 B2 | 12/2002 | Noble et al. |
| 6,627,530 B2 | 9/2003 | Li et al. |
| 6,762,474 B1 | 7/2004 | Mills, Jr. |
| 6,768,157 B2 | 7/2004 | Krieger et al. |
| 6,815,286 B2 | 11/2004 | Krieger et al. |
| 6,838,720 B2 | 1/2005 | Krieger et al. |
| 6,858,481 B2 | 2/2005 | Krieger et al. |
| 6,858,482 B2 | 2/2005 | Gilton |
| 6,864,127 B2 | 3/2005 | Yamazaki et al. |
| 6,864,522 B2 | 3/2005 | Krieger et al. |
| 6,881,994 B2 | 4/2005 | Lee et al. |
| 6,927,430 B2 | 8/2005 | Hsu |
| 6,939,787 B2 | 9/2005 | Ohtake et al. |
| 6,946,719 B2 | 9/2005 | Petti et al. |
| 7,020,006 B2 | 3/2006 | Chevallier et al. |
| 7,023,093 B2 | 4/2006 | Canaperi et al. |
| 7,026,702 B2 | 4/2006 | Krieger et al. |
| 7,073,069 B1 * | 7/2006 | Wasson .................. G06F 21/57 |
| | | 713/173 |
| 7,102,150 B2 | 9/2006 | Harshfield et al. |
| 7,122,853 B1 | 10/2006 | Gaun et al. |
| 7,167,387 B2 | 1/2007 | Sugita et al. |
| 7,187,577 B1 | 3/2007 | Wang et al. |
| 7,221,599 B1 | 5/2007 | Gaun et al. |
| 7,238,607 B2 | 7/2007 | Dunton et al. |
| 7,254,053 B2 | 8/2007 | Krieger et al. |
| 7,274,587 B2 | 9/2007 | Yasuda |
| 7,289,353 B2 | 10/2007 | Spitzer et al. |
| 7,324,363 B2 | 1/2008 | Kerns et al. |
| 7,365,411 B2 | 4/2008 | Campbell |
| 7,402,847 B2 | 7/2008 | Kozicki et al. |
| 7,405,418 B2 | 7/2008 | Happ et al. |
| 7,426,128 B2 | 9/2008 | Scheuerlein |
| 7,433,253 B2 | 10/2008 | Gogl et al. |
| 7,474,000 B2 | 1/2009 | Scheuerlein et al. |
| 7,479,650 B2 | 1/2009 | Gilton |
| 7,499,355 B2 | 3/2009 | Scheuerlein et al. |
| 7,511,532 B2 | 3/2009 | Derharcobian et al. |
| 7,521,705 B2 | 4/2009 | Liu |
| 7,534,625 B2 | 5/2009 | Karpov et al. |
| 7,541,252 B2 | 6/2009 | Eun et al. |
| 7,550,380 B2 | 6/2009 | Elkins et al. |
| 7,566,643 B2 | 7/2009 | Czubatyj et al. |
| 7,606,059 B2 | 10/2009 | Toda |
| 7,615,439 B1 | 11/2009 | Schricker et al. |
| 7,629,198 B2 | 12/2009 | Kumar et al. |
| 7,719,001 B2 | 5/2010 | Nomura et al. |
| 7,728,318 B2 | 6/2010 | Raghuram et al. |
| 7,729,158 B2 | 6/2010 | Toda et al. |
| 7,749,805 B2 | 7/2010 | Pinnow et al. |
| 7,760,538 B1 | 7/2010 | Paak |
| 7,772,581 B2 | 8/2010 | Lung |
| 7,778,063 B2 | 8/2010 | Brubaker et al. |
| 7,786,464 B2 | 8/2010 | Nirschl et al. |
| 7,786,589 B2 | 8/2010 | Matsunaga et al. |
| 7,824,956 B2 | 11/2010 | Schricker et al. |
| 7,829,875 B2 | 11/2010 | Scheuerlein |
| 7,835,170 B2 | 11/2010 | Bertin et al. |
| 7,859,884 B2 | 12/2010 | Scheuerlein |
| 7,875,871 B2 | 1/2011 | Kumar et al. |
| 7,881,097 B2 | 2/2011 | Hosomi et al. |
| 7,897,953 B2 | 3/2011 | Liu |
| 7,898,838 B2 | 3/2011 | Chen et al. |
| 7,920,412 B2 | 4/2011 | Hosotani et al. |
| 7,924,138 B2 | 4/2011 | Kinoshita et al. |
| 7,968,419 B2 | 6/2011 | Li et al. |
| 7,972,897 B2 | 7/2011 | Kumar et al. |
| 7,984,776 B2 | 7/2011 | Sastry et al. |
| 8,004,882 B2 | 8/2011 | Katti et al. |
| 8,018,760 B2 | 9/2011 | Muraoka et al. |
| 8,021,897 B2 | 9/2011 | Sills et al. |
| 8,045,364 B2 | 10/2011 | Schloss et al. |
| 8,054,674 B2 | 11/2011 | Tamai et al. |
| 8,067,815 B2 | 11/2011 | Chien et al. |
| 8,071,972 B2 | 12/2011 | Lu et al. |
| 8,074,082 B2 * | 12/2011 | Ozguz .................. H01L 23/48 |
| | | 380/264 |
| 8,084,830 B2 | 12/2011 | Kanno et al. |
| 8,088,688 B1 | 1/2012 | Herner |
| 8,097,874 B2 | 1/2012 | Venkatasamy et al. |
| 8,102,698 B2 | 1/2012 | Scheuerlein |
| 8,143,092 B2 | 3/2012 | Kumar et al. |
| 8,144,498 B2 | 3/2012 | Kumar et al. |
| 8,164,948 B2 | 4/2012 | Katti et al. |
| 8,168,506 B2 | 5/2012 | Herner |
| 8,183,553 B2 | 5/2012 | Phatak et al. |
| 8,187,945 B2 | 5/2012 | Herner |
| 8,198,144 B2 | 6/2012 | Herner |
| 8,207,064 B2 | 6/2012 | Bandyopadhyay et al. |
| 8,227,787 B2 | 7/2012 | Kumar et al. |
| 8,231,098 B2 | 7/2012 | Albano et al. |
| 8,233,308 B2 | 7/2012 | Schricker et al. |
| 8,237,146 B2 | 8/2012 | Kreupl et al. |
| 8,258,020 B2 | 9/2012 | Herner |
| 8,269,203 B2 | 9/2012 | Greene et al. |
| 8,274,812 B2 | 9/2012 | Nazarian et al. |
| 8,315,079 B2 | 11/2012 | Kuo et al. |
| 8,320,160 B2 | 11/2012 | Nazarian |
| 8,374,018 B2 | 2/2013 | Lu |
| 8,385,100 B2 | 2/2013 | Kau et al. |
| 8,394,670 B2 | 3/2013 | Herner |
| 8,467,227 B1 | 6/2013 | Jo |
| 8,658,476 B1 | 2/2014 | Sun et al. |
| 8,659,003 B2 | 2/2014 | Herner et al. |
| 8,860,197 B2 * | 10/2014 | Clark .................. H01L 29/0657 |
| | | 257/679 |
| 2003/0036238 A1 | 2/2003 | Toet et al. |
| 2003/0141565 A1 | 7/2003 | Hirose et al. |
| 2004/0026682 A1 | 2/2004 | Jiang |
| 2004/0059908 A1 * | 3/2004 | Yamada .................. H04L 9/003 |
| | | 713/151 |
| 2004/0170040 A1 | 9/2004 | Rinerson et al. |
| 2005/0020510 A1 | 1/2005 | Benedict |
| 2005/0029587 A1 | 2/2005 | Harshfield |
| 2005/0052915 A1 | 3/2005 | Herner et al. |
| 2005/0062045 A1 | 3/2005 | Bhattacharyya |
| 2005/0073881 A1 | 4/2005 | Tran et al. |
| 2006/0017488 A1 | 1/2006 | Hsu |
| 2006/0095771 A1 * | 5/2006 | Appenzeller ......... H04L 9/3247 |
| | | 713/171 |
| 2006/0281244 A1 | 12/2006 | Ichige et al. |
| 2006/0289658 A1 * | 12/2006 | Fischer ............. G06Q 20/3576 |
| | | 235/492 |
| 2007/0008773 A1 | 1/2007 | Scheuerlein |
| 2007/0015348 A1 | 1/2007 | Hsu et al. |
| 2007/0045615 A1 | 3/2007 | Cho et al. |
| 2007/0087508 A1 | 4/2007 | Herner |
| 2007/0090425 A1 | 4/2007 | Kumar et al. |
| 2007/0105284 A1 | 5/2007 | Herner |
| 2007/0105390 A1 | 5/2007 | Oh |
| 2007/0205510 A1 | 9/2007 | Lavoie et al. |
| 2007/0228414 A1 | 10/2007 | Kumar et al. |
| 2007/0284575 A1 | 12/2007 | Li et al. |
| 2007/0290186 A1 | 12/2007 | Bourim et al. |
| 2007/0291527 A1 | 12/2007 | Tsushima et al. |
| 2007/0295950 A1 | 12/2007 | Cho et al. |

(56) References Cited

U.S. PATENT DOCUMENTS

| | | |
|---|---|---|
| 2008/0002481 A1 | 1/2008 | Gogl et al. |
| 2008/0006907 A1 | 1/2008 | Lee et al. |
| 2008/0048164 A1 | 2/2008 | Odagawa |
| 2008/0089110 A1 | 4/2008 | Robinett et al. |
| 2008/0090337 A1 | 4/2008 | Williams |
| 2008/0105925 A1 | 5/2008 | Pae et al. |
| 2008/0106926 A1 | 5/2008 | Brubaker et al. |
| 2008/0185567 A1 | 8/2008 | Kumar et al. |
| 2008/0205179 A1 | 8/2008 | Markert et al. |
| 2008/0206931 A1 | 8/2008 | Breuil et al. |
| 2008/0220601 A1 | 9/2008 | Kumar et al. |
| 2008/0232160 A1 | 9/2008 | Gopalakrishnan |
| 2008/0278990 A1 | 11/2008 | Kumar et al. |
| 2008/0304312 A1 | 12/2008 | Ho et al. |
| 2008/0311722 A1 | 12/2008 | Petti et al. |
| 2009/0001345 A1 | 1/2009 | Schricker et al. |
| 2009/0014707 A1 | 1/2009 | Lu et al. |
| 2009/0052226 A1 | 2/2009 | Lee et al. |
| 2009/0065591 A1* | 3/2009 | Paul .............. G06K 19/07381 235/492 |
| 2009/0095951 A1 | 4/2009 | Kostylev et al. |
| 2009/0152737 A1 | 6/2009 | Harshfield |
| 2009/0168486 A1 | 7/2009 | Kumar |
| 2009/0182965 A1* | 7/2009 | Norman .............. G11C 7/24 711/163 |
| 2009/0231910 A1 | 9/2009 | Liu et al. |
| 2009/0250787 A1 | 10/2009 | Kutsunai |
| 2009/0256130 A1 | 10/2009 | Schricker |
| 2009/0257265 A1 | 10/2009 | Chen et al. |
| 2009/0267047 A1 | 10/2009 | Sasago et al. |
| 2009/0298224 A1 | 12/2009 | Lowrey |
| 2009/0321789 A1 | 12/2009 | Wang et al. |
| 2010/0007937 A1 | 1/2010 | Widjaja et al. |
| 2010/0012914 A1 | 1/2010 | Xu et al. |
| 2010/0019221 A1 | 1/2010 | Lung et al. |
| 2010/0019310 A1 | 1/2010 | Sakamoto |
| 2010/0032638 A1 | 2/2010 | Xu |
| 2010/0032640 A1 | 2/2010 | Xu |
| 2010/0039136 A1 | 2/2010 | Chua-Eoan et al. |
| 2010/0044708 A1 | 2/2010 | Lin et al. |
| 2010/0084625 A1 | 4/2010 | Wicker et al. |
| 2010/0085798 A1 | 4/2010 | Lu et al. |
| 2010/0090192 A1 | 4/2010 | Goux et al. |
| 2010/0101290 A1 | 4/2010 | Bertolotto |
| 2010/0102290 A1 | 4/2010 | Lu et al. |
| 2010/0157651 A1 | 6/2010 | Kumar et al. |
| 2010/0157710 A1 | 6/2010 | Lambertson et al. |
| 2010/0159688 A1* | 6/2010 | Rinerson ............ G11C 13/0007 257/E21.575 |
| 2010/0163828 A1 | 7/2010 | Tu |
| 2010/0176368 A1 | 7/2010 | Ko et al. |
| 2010/0219510 A1 | 9/2010 | Scheuerlein et al. |
| 2010/0221868 A1 | 9/2010 | Sandoval |
| 2010/0321095 A1 | 12/2010 | Mikawa et al. |
| 2011/0001115 A1 | 1/2011 | Greene et al. |
| 2011/0006275 A1 | 1/2011 | Roelofs et al. |
| 2011/0089391 A1 | 4/2011 | Mihnea et al. |
| 2011/0128779 A1 | 6/2011 | Redaelli et al. |
| 2011/0133149 A1 | 6/2011 | Sonehara |
| 2011/0136327 A1 | 6/2011 | Han et al. |
| 2011/0155991 A1 | 6/2011 | Chen |
| 2011/0194329 A1 | 8/2011 | Ohba et al. |
| 2011/0198557 A1 | 8/2011 | Rajendran et al. |
| 2011/0204312 A1 | 8/2011 | Phatak |
| 2011/0205780 A1 | 8/2011 | Yasuda et al. |
| 2011/0205782 A1 | 8/2011 | Costa et al. |
| 2011/0212616 A1 | 9/2011 | Seidel et al. |
| 2011/0227028 A1 | 9/2011 | Sekar et al. |
| 2011/0284814 A1 | 11/2011 | Zhang |
| 2011/0305064 A1 | 12/2011 | Jo et al. |
| 2011/0312151 A1 | 12/2011 | Herner |
| 2011/0317470 A1 | 12/2011 | Lu et al. |
| 2012/0001146 A1 | 1/2012 | Lu et al. |
| 2012/0007035 A1 | 1/2012 | Jo et al. |
| 2012/0008366 A1 | 1/2012 | Lu |
| 2012/0012806 A1 | 1/2012 | Herner |
| 2012/0015506 A1 | 1/2012 | Jo et al. |
| 2012/0025161 A1 | 2/2012 | Rathor et al. |
| 2012/0033479 A1 | 2/2012 | Delucca et al. |
| 2012/0043519 A1 | 2/2012 | Jo et al. |
| 2012/0043520 A1 | 2/2012 | Herner et al. |
| 2012/0043621 A1 | 2/2012 | Herner |
| 2012/0043654 A1 | 2/2012 | Lu et al. |
| 2012/0057697 A1* | 3/2012 | Holtmanns ........ H04N 21/6543 380/42 |
| 2012/0075910 A1 | 3/2012 | Yasuda |
| 2012/0080798 A1 | 4/2012 | Harshfield |
| 2012/0104351 A1 | 5/2012 | Wei et al. |
| 2012/0108030 A1 | 5/2012 | Herner |
| 2012/0140929 A1 | 6/2012 | Clark et al. |
| 2012/0142163 A1 | 6/2012 | Herner |
| 2012/0145984 A1 | 6/2012 | Rabkin et al. |
| 2012/0155146 A1 | 6/2012 | Ueda et al. |
| 2012/0205606 A1 | 8/2012 | Lee et al. |
| 2012/0220100 A1 | 8/2012 | Herner |
| 2012/0235112 A1 | 9/2012 | Huo et al. |
| 2012/0236625 A1 | 9/2012 | Ohba et al. |
| 2012/0305874 A1 | 12/2012 | Herner |
| 2012/0326265 A1 | 12/2012 | Lai et al. |
| 2013/0027081 A1 | 1/2013 | Nazarian et al. |
| 2014/0009995 A1* | 1/2014 | Amarilio .............. G11C 7/24 29/832 |
| 2014/0042627 A1* | 2/2014 | Edelstein .............. G09C 1/00 257/E21.59 |

FOREIGN PATENT DOCUMENTS

| | | |
|---|---|---|
| EP | 2405441 A1 | 1/2012 |
| EP | 2408035 A2 | 1/2012 |
| JP | 2005-506703 A | 3/2005 |
| JP | 2006-032951 A | 2/2006 |
| JP | 2007-067408 A | 3/2007 |
| JP | 2007-261208 | 10/2007 |
| JP | 2007-328857 A | 12/2007 |
| KR | 1026110014248 A | 2/2011 |
| TW | I250424 B | 3/2006 |
| WO | WO 03/034498 A1 | 4/2003 |
| WO | WO 2009/005699 A1 | 1/2009 |

OTHER PUBLICATIONS

Patent Trial and Appeal Board (PTAB) Decision on Appeal Erratum for U.S. Appl. No. 13/673,951 dated Feb. 24, 2021 4 pages.
Patent Trial and Appeal Board (PTAB) Decision, Examiner Reversed for U.S. Appl. No. 13/673,951 dated Feb. 19, 2021, 13 pages.
Final Office Action for U.S. Appl. No. 13/673,951 dated May 2, 2018, 21 pages.
Petition Decision for U.S. Appl. No. 13/673,951 dated Aug. 20, 2019, 3 pages.
Examiner's Answer to Appeal Brief for U.S. Appl. No. 13/673,951 dated Jan. 8, 2019, 8 pages.
Pre-Brief Appeal Conference Decision for U.S. Appl. No. 13/673,951 dated Sep. 4, 2018, 2 pages.
Pre-Brief Appeal Conference Request for U.S. Appl. No. 13/673,951 dated Aug. 2, 2018, 8 pages.
Chinese Office Action received for Chinese Patent Application No. 201310557122.6 dated Apr. 4, 2018, 20 pages.
Taiwanese Office Action for Taiwanese Patent Application No. 102140860 dated Feb. 13, 2017, 18 pages (including English translation).
Taiwanese Office Action for Taiwanese Patent Application No. 102140860 dated Aug. 29, 2017, 19 pages (including English translation).
Taiwanese Office Action for Taiwanese Patent Application No. 102140860 dated Jan. 24, 2018, 15 pages (including English translation).
Non-Final Office Action for U.S. Appl. No. 13/673,951 dated Aug. 27, 2014, 30 pages.
Office Action for U.S. Appl. No. 12/861,432, dated March 29, 2013.

(56) References Cited

OTHER PUBLICATIONS

Notice of Allowance for U.S. Appl. No. 13/725,331, dated Jan. 17, 2014.
Office Action for U.S. Appl. No. 13/739,263, dated Jan. 16, 2014.
Office Action for U.S. Appl. No. 13/920,021, dated Jan. 10, 2014.
Office Action for U.S. Appl. No. 12/861,432, dated Jan. 8, 2014.
Office Action for U.S. Appl. No. 13/586,815, dated Jan. 29. 2014.
International Search Report and Written Opinion for PCT/US2013/061244, dated Sep. 23, 2013.
Office Action for U.S. Appl. No. 13/434,567, dated Feb. 6, 2014.
Office Action for U.S. Appl. No. 13/620,012, dated Feb. 11, 2014.
Notice of Allowance for U.S. Appl. No. 13/468,201, dated Feb. 20, 2014.
Office Action for U.S. Appl. No. 12/625.817, dated Feb. 26, 2014.
Office Action for U.S. Appl. No. 12/835,704, dated Mar. 14, 2014.
Office Action for U.S. Appl. No. 13/870,919, dated Apr. 3, 2014
Office Action for U.S. Appl. No. 13/167,920, dated Mar. 12, 2014
International Search Report and Written Opinion for PCT/US2013/077628, dated Dec. 23, 2013
Notice of Allowance for U.S. Appl. No. 13/194,479, dated Feb. 5, 2014.
Jian Hu et al., "Area-Dependent Switching In Thin Film-Silicon Devices", Materials Research Society, Mal. Res. Soc. Symp Proc., 2003, pp. A18.3.1-A18.3.6, vol. 762.
André Dehon, "Array-Based Architecture for FET-Based, Nanoscale Electronics", IEEE Transactions on Nanotechnology, Mar. 2003, pp. 23-32, vol. 2, No.1, IEEE.
Herb Goronkin et al., "High-Performance Emerging Solid-State Memory Technologies", MRS Bulletin, www.mrs.org/publications/bulletin, Nov. 2004, pp. 805-813.
Gerhard Moller et al., "Status And Outlook of Emerging Nonvolatile Memory Technologies", IEEE, 2004, pp. 567-570.
A.E. OWEN et al., "Memory Switching In Amorphous Sticon Devices", Journal of Non-Crystalline Solids 59 & 60, 1983, pp. 1273-1280, North Holland Publishing Company/Physical Society of Japan.
J. Campbell Scott, "Is There an immortal Memory?". www.sciencemag.org. Apr. 2. 2004, pp. 62-63, vol. 304 No. 5667, American Association for the Advancement of Science.
S.H. Lee et al., "Full Integration and Cell Characteristics For 64Mb Nonvolatile PRAM" 2004 Symposium on VLSI Technology Digest of Technical Papers, IEEE, 2004, pp. 20-21.
Stephen Y. Chou et al., "Imprint Lithography With 25-Nanometer Resolution", Science, Apr. 5, 1996, pp. 85-87, vol. 272, American Association for the Advancement of Science.
S. Zankovych et al., "Nanoimprint Lithography: challenges and prospects". Nanotechnology, 2001, pp. 91-95, vol. 12, Institute of Physics Publishing.
A. Avila et al., "Switching in coplanar amorphous hydrogenated silicon devices", Solid-State Electronics, 2000, pp. 17-27, vol. 44, Elsevier Science Ltd.
Jian Hu et al., "Switching and filament formation in hot-wire CVD p-type e-Si:H devices", Thin Solid Films, Science Direct, www.sciencedirect.com, 2003, pp. 249-252, vol. 430. Elsevier Science B.V.
S. Hudgens et al., "Overview of Phase-Change Chalcogenide Nonvolatile Memory Technology", MRS Bulletin, www.mrs.org/publications/bulletin. Nov. 2004, pp. 829-832.
K. Terabe et al., "Quantized conductance atomic switch", NATURE, www.nature.com/nature, Jan. 6, 2005, pp. 47-50, vol. 433, Nature Publishing Group.
Michael Kund et al., "Conductive bridging RAM (CBRAM): An emerging non-volatile memory technology scalable to sub 20nm", IEEE, 2005.
W. Den Boer, "Threshold switching in hydrogenated amorphous silicon", Appl. Phys. Letter, 1982. pp. 812-813, vol. 40, American Institute of Physics.
P.G. Lecomber et al., "The Switching Mechanism In Amorphous Silicon Junctions", Journal of Non-Crystalline Solids, 1985, pp. 1373-1382. vol. 77 & 78, Elsevier Science Publishers B.V., North Holand Physics Publishing Division, North-Holland, Amsterdam.
A. E. Owen et al., "Switching in amorphous devices", INT. J. Electronics, 1992, pp. 897-906, vol. 73, No.5, Taylor and Francis Ltd.
M. Jafar et al., "Switching in amorphous-silicon devices", Physical Review B, May 15, 1994, pp. 611-615, vol, 49, No. 19, The American Physical Society.
Alexandra Stikeman, "Polymer Memory—The plastic path to better data storage". Technology Review, www.technologyreview.com, Sep. 2002, pp. 31.
Yong Chen et al., "Nanoscale molecular-switch crossbar circuits", Nanotechnology, 2003, pp. 462-468, vol.14, Institute of Physics Publishing Ltd.
C. P. Collier et al., "Electronically Configurable Molecular-Based Logic Gates", Science Jul. 16, 1999, pp. 391-395, vol. 285, No. 5426, American Association for the Advancement of Science.
Office Action for U.S. Appl. No. 11/875,541 dated Jul. 22, 2010.
Office Action for U.S. Appl. No. 11/875,541 dated Mar. 30, 2011.
Office Action for U.S. Appl. No. 11/875,541 dated Oct. 5, 2011.
Office Action for U.S. Appl. No. 11/875,541 dated Jun. 8, 2012.
Jang Wook Choi, "Bistable [2]Rotaxane Based Molecular Electronics: Fundamentais and Applications", Dissertation, Chapter 3, <http://resolver.caltech.edu/CaltechETD:etd-05242007-194737> 2007, pp. 79-120, California Institute of Technology, Pasadena.
Sung-Hyun Jo et al., "A Silicon-Based Crossbar Ultra-High-Density Non-Volatile Memory", SSEL Annual Report 2007.
International Search Report for PCT/US2009/080023 dated Oct. 8, 2009.
Rainer Waser et al., "Nanolonics-based resistive switching memories", Nature Materials, Nov. 2007, pp. 833-835, vol. 5, Nature Publishing Group.
Written Opinion of the International Searching Authority for PCT/US2009/060023 dated Oct. 8, 2009.
Ex parte Quayle Action for U.S. Appl. No. 12/826,653 dated May 8, 2012.
International Search Report for PCT/US2011/040090 dated Jun. 10, 2011.
Written Opinion of the International Searching Authority for PCT/US2011/040090 dated Jun. 10, 2011.
Notice of Allowance for U.S. Appl. No. 13/156,231 dated Apr. 17, 2012.
Office Action for U.S. Appl. No. 12/835,704 dated Sep. 21, 2011.
Office Action for U.S. Appl. No. 12/835,704 dated Mar. 1, 2012.
Advisory Action for U.S. Appl. No. 12/835.704 datd Jun. 8, 2012.
International Search Report and Written Opinion for PCT/US2011/045035 dated on Jul. 29. 2011.
Office Action for U.S. Appl. No. 12/861,650 dated Jan. 25, 2012.
Notice of Allowance for U.S. Appl. No. 12/861,650 dated Jun. 19, 2012.
Sung Hyun Jo et al., "Programmable Resistance Switching in Nanoscale Two-Terminal Devices," Supporting Information. Dec. 29, 2008, pp. 1-4, vol. 9., No. 1, Department of Electrical Engineering and Computer Science, the University of Michigan, Ann Arbor, Michigan.
Kuk-Hwan Kim et al., "Nanoscale resistive memory with intrinsic diode characteristics and long endurance," Applied Physics Letters, 2010, pp. 053106-1-053106-3, vol. 96, American Institute of Physics.
Sung Hyun Jo et al., "Si-Based Two-Terminal Resistive Switching Nonvolatile Memory", IEEE, 2008.
Sung Hyun Jo et al., "Nanoscale Memristor Device as Synapse in Neuromorphic Systems", Nano Letters, 10, 1297-1301, 2010, pubs.acs.org/NanoLett, A-E, American Chemical Society Publications.
Wei Lu et al., "Nanoelectronics from the bottom up", Nature Materials, www.nature.com/naturematerials, November 2007, pp. 841-850, vol. 6, Nature Publishing Group.
Sung Hyun Jo et al., "Ag/a-Sich/c-Si Resistive Switching Nonvolatile Memory Devices". Nanotechnology Materials and Devices Conference, IEEE, 2006, pp. 116-117, vol. 1.
Sung Hyun Jo et al., "Experimental, Modeling and Simulation Studies of Nanoscale Resistance Switching Devices", $9^{th}$ Conference on Nanotechnology, IEEE, 2009, pp. 493. 495.

(56) References Cited

OTHER PUBLICATIONS

Sung Hyun Jo et al., "Nonvolatile Resistive Switching Devices Based on Nanoscale Metal/Amorphous Silicon/Crystalline Silicon Junctions", Mater. Res. Soc. Symp. Proc., 2007, vol. 997, Materials Research Society.
Sung Hyun Jo et al., "Si Memristive Devices Applied to Memory and Neuromorphic Circuits", Proceedings of 2010 IEEE International Symposium on Circuits and Systems. 2010, pp. 13-16.
Wei Lu et al., "Supporting Information", 2008.
Sung Hyun Jo et al., "High-Density Crossbar Arrays Based on a Si Memristive System", Nano Letters, 2009, pp. 870-874, vol. 9 No. 2, American Chemical Society Publications.
Sung Hyun Jo et al .. "High-Density Crossbar Arrays Based on a Si Memristive System", Supporting Information, 2009, pp. 1-4.
Sung Hyun Jo et al., "Programmable Resistance Switching in Nanoscale Two-Terminal Devices", Nano Letters, 2009, pp, 496-500, vol. 9 No. 1, American Chemical Society Publications.
Shubhra Gangopadhyay et al., "Memory Switching in Sputtered Hydrogenated Amorphous Silicon (a-Si:H)", Japanese Journal of Applied Physics, Short Notes, 1985, pp. 1363-1364, vol. 24 No. 10.
S. K. Dey, "Electrothermal model of switching in amorphous sticon films", J. Vac. Sci. Technol., Jan./Feb. 1980, pp, 445-448, vol. 17, No. 1, American Vacuum Society.
J. Hajto et al., "The Programmability of Amorphous Silicon Analogue Memory Elements", Mat. Res. Soc. Symp, Proc., 1990, pp. 405-410, vol. 192, Materials Research Society.
M. J. Rose et al., "Amorphous Silicon Analogue Memory Devices", Journal of Non-Crystalline Solids, 1989, pp. 168-170, vol. 115, Elsevier Science Publishers B.V., North-Holland.
A. Moopenn et al., "Programmable Synaptic Devices For Electronic Neural Nets", Control and Computers, 1990, pp. 37-41, vol. 18 No. 2.
P.G. Le Comber, "Present and Future Applications of Amorphous Silicon and Its Alloys", Journal of Non-Crystalline Solids, 1989, pp. 1-13, vol. 115, Elsevier Science Publishers B.V., North-Holland.
J. Hu, et al., "AC Characteristics of Crip a-Si:H/V Analog Switching Devices", IEEE Transactions on Electron Devices, Sep. 2000, pp.1751-1757, vol. 47 No. 9. IEEE.
A.E. Owen et al., "New amorphous-silicon electrically programmable nonvolatile switching device", Solid-State and Electron Devices, IEEE Proceedings, Apr. 1982, pp. 51-54, Vol. 129, Pt. I., No. 2.
J. Hajto et al., "Amorphous & Microcrystalline Semiconductor Devices: Volume 2, Materials and Device Physics", Mar. 1, 2004, pp. 640-700, Artech House Publishers.
J. Hajto et al., "Analogue memory and ballistic electron effects in metal-amorphous silicon structures", Philosophical Magazine B. 1991, pp. 349-369, vol. 63 No. 1. Taylor & Francis Ltd.
A. J. Holmes et al., "Design of Analogue Synapse Circuits using Non-Volatile a-Si:H Memory Devices", Proceedings of ISCAS, 1994, pp. 351-354.
Yajie Dong et al., "Si/a-Si Core/Shell Nanowires as Nonvolatile Crossbar Switches", Nano Letters, Jan. 2008, pp. 386-391, vol. 8 No. 2, American Chemical Society.
European Search Report for Application No. EP 09 81 9890.6 dated Mar. 27, 2012.
D. A. Muller et al., "The Electronic structure at the atomic scale of ultrathin gate oxides", Nature, Jun. 24, 1999, pp. 758-761, vol. 399.
J. Suńé et al., "Nondestructive multiple breakdown events in very thin SIO2 films", Applied Physics Letters, 1989, pp. 128-130, vol. 55.
Herve Marand et al., MESc. 5025 lecture notes: Chapter 7. Diffusion, University of Vermont, http://www.files.chem.vt.edu/chem-dept/marand/MEScchap6-1c.pdf.
A. E. Owen et al., "Electronic Switching in Amorphous Sicon Devices: Properties of the Conducting Filament", Proceedings of 5th international Conference on Solid-State and Integrated Circuit Technology, IEEE, 1998, pp. 830-833.
Sung Hyun Jo, "Nanoscale Memristive Devices for Memory and Logic Applications", Ph. D dissertation, University of Michigan, 2010.
Office Action for U.S. Appl. No. 12/894,098 dated Aug. 1, 2012.
Sung Hyun Jo et al., "CMOS Compatible Nanoscale Nonvolatile Resistance Switching Memory", Neno Letters, 2008, pp. 392-397, vol. 8, No. 2.
Office Action for U.S. Appl. No. 12/582,086 dated Apr. 19, 2011.
Office Action for U.S. Appl. No. 12/582,086 dated Sep. 6, 2011.
Notice of Allowance for U.S. Appl. No. 12/582,086 dated Oct. 21, 2011.
International Search Report for PCT/US2009/061249 dated Oct. 20, 2009.
Written Opinion of the International Searching Authority for PCT/US2009/061249 dated Oct. 20, 2009.
Office Action for U.S. Appl. No. 12/861,850 dated Oct 16, 2012.
Notice of Allowance for U.S. Appl. No. 12/894,087 dated Oct. 25, 2012.
Notice of Alowance for U.S. Appl. No. 13/149,607 dated Oct. 29, 2012
Notice of Allowance for U.S. Appl. No. 12/861,666 dated Nov. 14, 2012.
Office Action for U.S. Appl. No. 13/156,232, dated Nov. 26, 2012.
Notice of Allowance for U.S. Appl. No. 13/290,024 dated Nov. 28, 2012.
Notice of Allowance for U.S. Appl. No. 12/814,410 dated Jan. 8, 2013.
Corrected Notice of Allowance for U.S. Appl. No. 12/861,666 dated Jan. 11, 2013.
Supplemental Notice of Allowance for U.S. Appl. No. 12/894,087 dated Jan. 11, 2013.
Notice of Allowance for U.S. Appl. No. 13/314,513 dated Jan. 24, 2013.
Notice of Allowance for U.S. Appl. No. 13/118,258, dated Feb. 6, 2013.
International Search Report and Written Opinion for PCT/US2012/040242, filed May 31, 2012.
Office Action for U.S. Appl. No. 13/174,264 dated Ma. 6, 2013.
Office Action for U.S. Appl. No. 13/679,976, dated Mar. 6, 2013.
Notice of Allowance for U.S. Appl. No. 12/894,098, dated Mar. 15, 2013.
Office Action for U.S. Appl. No. 13/465,188, dated Mar. 19, 2013.
Office Action for U.S. Appl. No. 12/861.432 dated Mar. 29, 2013.
Notice of Allowance for U.S. Appl. No. 13/748,490, dated Apr. 9, 2013.
Office Action for U.S. Appl. No. 13/725,331, dated May 20, 2013.
International Search Report and Written Opinion for PCT/US2012/045312 filed Jul. 2, 2012.
Office Action for U.S. Appl. No. 13/466,008, dated Jul. 29, 2013.
Russo, U. et al, "Self-Accelerated Thermal Dissolution Model for Reset Programming in Unipolar Resistive-Switching Memory (RRAM) Devices", IEEE Transactions on Electron Devices, Feb. 2009, pp. 193-200, vol. 56, Issue 2.
Cagli, C. et al. "Evidence for threshold switching in the set process of NIO-based RRAM and physical modeling for set, reset, retention and disturb prediction", 2008 IEEE International Electron Devices Meeting (IEDM), December 15-17, 2008, pp. 1-4, San Francisco, CA, USA.
Office Action for U.S. Appl. No. 13/077,941, dated Aug. 12, 2013
Office Action of U.S. Appl. No. 13/436,714 dated Aug. 27, 2013.
Notice of Allowance for U.S. Appl. No. 13/679,976, dated Sep. 17, 2013.
Office Action for U.S. Appl. No.13/189,401 dated Sep. 30, 2013.
Office Action for U.S. Appl. No. 13/462,653 dated Sep. 30, 2013.
Corrected Notice of Allowability for U.S. Appl. No. 13/733,828, dated Oct. 1, 2013.
Notice of Allowance for U.S. Appl. No. 13/733,828, dated Aug. 8, 2013.
Office Action for U.S. Appl. No. 13/594,665 dated Aug. 2, 2013.
Notice of Allowance for U.S. Appl. No. 13/769,152, dated Oct. 8, 2013.
Notice of Allowance for U.S. Appl. No. 13/905,074, dated Oct. 8, 2013.

(56) References Cited

OTHER PUBLICATIONS

Notice of Allowability for U.S. Appl. No. 13/452,657, dated Oct. 10, 2013.
Notice of Allowance for U.S. Appl. No. 13/174,264, dated Oct. 16. 2013.
Notice of Allowabilly for U.S. Appl. No. 13/417,135, dated Oct. 23, 2013.
Office Action for U.S. Appl. No. 13/174,077 dated Apr. 1, 2013.
Office Action for U.S. Appl. No. 12/814,410 dated Apr. 17, 2012.
Office Action for U.S. Appl. No. 12/836.699 dated Aug. 24, 2011.
Notice of Allowance for U.S. Appl. No. 12/835,699 dated Feb. 6, 2012.
Office Action for U.S. Appl. No. 12/833,898 dated Apr. 5, 2012
European Search Report for Application No. EP 1100 5207.3 dated Oct. 12, 2011.
Notice of Allowance for U.S. Appl. No. 12/833,838 dated May 30, 2012.
Notice of Allowance for U.S. Appl. No. 12/939,824 dated May 11, 2012.
Notice of Allowance for U.S. Appl. No. 12/940,920 dated Oct. 5, 2011.
Office Action for U.S. Appl. No. 13/314,513 dated Mar. 27, 2012.
Shong Yin, "Solution Processed Silver Sulfide Thin Films for Filament Memory Applications", Technical Report No, UCB/EECS-2010-156, http://www.eecs.berkeley.edu/Pubs/TechRpts/2010/EECS-2010-166.html, Dec. 17, 2010, Electrical Engineering and Computer Sciences, University of California at Berkeley.
Office Action for U.S. Appl. No. 13/149,653 dated Apr. 25, 2012.
International Search Report for PCT/US2011/045124 dated Jul. 22, 2011.
Written Opinion of the international Searching Authority for PCT/US2011/045124 dated Jul. 22, 2011.
Peng-Heng Chang et al., "Aluminum spiking at contact windows in AV/Ti-W/Si", Appl. Phys. Lett., Jan. 25, 1988, pp. 272-274, vol. 52 No. 4, American Institute of Physics.
J. Del Alamo et al, "Operating Limits of Al-alloyed High-Low Junctions for BSF Solar Cells", Solid-State Electronics, 1981, pp. 415-420, vol. 24, Pergamon Press Ltd., Great Britain.
Hao-Chih Yuan et al., "Silicon Solar Cels with Front Hetero-Contact and Aluminum Alloy Back Junction", NREL Conference Paper CP-520-42566, 33rd IEEE Photovoltaic Specialists Conference, May 11-16, 2008, National Renewable Energy Laboratory, San Diego, California.
Notice of Allowance for U.S. Appl. No. 12/939,824 dated Jul. 24, 2012.
Office Action for Application No. EP 11005207.3 dated Aug. 8. 2012.
Office Action for U.S. Appl. No. 13/417,135 dated Oct. 9, 2012.
Notice of Allowance for U.S. Appl. No. 13/532.019 dated Nov. 14, 2012.
Office Action for U.S. Appl. No. 13/149,653 dated Nov. 20, 2012.
Ofice Action of U.S. Appl. No. 13/436,714 dated Dec. 7, 2012.
Ofice Action for U.S. Appl. No. 13/174,077 dated Sep. 17, 2012.
International Search Report and Written Opinion for PCT/US2012/048712 dated Jul. 27. 2012.
Office Action for U.S. Appl. No. 13/194,479 dated Sep. 25, 2013
Ofice Action for U.S. Appl. No. 13/194,479 dated Dec. 17, 2012.

\* cited by examiner

SECURE CIRCUIT INTEGRATED WITH MEMORY LAYER

CROSS-REFERENCE TO RELATED APPLICATIONS

This application is a continuation of U.S. patent application Ser. No. 13/673,951 filed Nov. 9, 2012, and entitled SECURE CIRCUIT INTEGRATED WITH MEMORY LAYER, the disclosure of which is hereby expressly incorporated by reference herein in its entirety and for all purposes.

BACKGROUND OF THE INVENTION

Security is a major concern for many applications of integrated circuits. Organizations invest considerable resources into the configuration of circuits, and many of these organizations wish to protect that investment. Circuits in certain applications may present inherent security concerns, such as circuits used for missile guidance systems or other sensitive military and government applications.

Due to the value of the information contained in integrated circuits, considerable efforts have been made in reverse engineering by both government and industry. Circuit transmissions can be monitored and decrypted, and the circuits themselves can be physically deconstructed by successive etching operations. Imaging operations such as scanning electron microscopy (SEM) can be conducted between successive etches to discover circuit architecture. Other imaging techniques can be used when a circuit is in operation to directly or indirectly detect heat or electricity.

Conventional methods for securing communication between integrated circuits and memory have been directed to encrypting the communications. However, this method has disadvantages. Communication circuitry is difficult to obscure, and therefore can be tapped by a dedicated reverse engineer. As technology develops, decryption techniques become more advanced, so communications that are secure today become less secure over the lifetime of a device. Some devices, such as certain aerospace applications, can have a long service life, so it is possible for current encryption techniques to become vulnerable during the lifetime of a device. In addition, if the key becomes known, access to a data stream is an undesirable vulnerability.

BRIEF SUMMARY OF THE INVENTION

Embodiments of the present invention may overcome one or more problems associated with circuit security, for example by embedding a security key on one or more memory layer disposed over a logic layer in a circuit device.

In one embodiment, a secure circuit device includes a logic layer, one or more memory layers comprising non-volatile memory cells disposed over the circuit layer and integrated with the logic layer, a plurality of connectors provided between the logic layer and the one or more memory layers to electrically couple the logic layer and the one or more memory layers, and a security key disposed in the non-volatile memory cells of at least one memory layer, the security key being a key required for enabling access to the logic layer for operation.

The security circuit may include a first memory layer and a second memory layer, and non-volatile memory cells storing the security key may be one time programmable memory cells. The non-volatile memory cells may be resistive memory cells arranged in a crossbar configuration.

In an embodiment, the memory layers may include two terminal cells in a resistive memory (RRAM) a phase-change memory (PCRAM), a ferroelectric memory (FE-RAM), or a magnetic memory (MRAM).

A security key may include portions with a first key portion disposed in a first area, and a second key portion disposed in a second area that is vertically located with respect to the first area. In such an embodiment, the first area may be a first memory layer, and the second area may be a second memory layer disposed over the first memory layer, wherein the second security key portion is used to unlock the first security key portion, and the first security key portion is used to unlock the logic layer. An embodiment may further comprise a third security key portion disposed on a third memory layer in a third area that is vertically located with respect to the first area.

The present invention may be embodied on a system including a secure circuit device which includes a logic layer, one or more memory layers comprising non-volatile memory cells disposed over the logic layer and integrated with the logic layer in a monolithic structure, and a security key disposed in the non-volatile memory cells of at least one memory layer, the security key being a key required for enabling access to the logic layer for operation. The one or more memory layers may include a first memory layer and a second memory layer.

In an embodiment, a security circuit in the system has security key that includes a first key portion disposed in a first area, and a second key portion disposed in a second area that is vertically located with respect to the first area. The first area may be a first memory layer, and the second area may be a second memory layer disposed over the first memory layer, wherein the second security key portion is used to unlock the first security key portion, and the first security key portion is used to unlock the logic layer. The circuit in the system may further include a third security key portion disposed on a third memory layer, wherein the first, second, and third security key portions are all needed to unlock the logic layer, and a dummy key disposed in one or more memory layer.

In an embodiment of the system, the non-volatile memory cells storing the security key may be one time programmable memory cells, and in an embodiment they may include two terminal cells. The non-volatile memory cells may be resistive memory cells arranged in a crossbar configuration. The logic layer may include one or more processing or computational elements, and the system may further comprise access logic, wherein the access logic is configured to receive the security key disposed in the non-volatile memory cells and is configured to enable access to the logic layer in response thereto.

DETAILED DESCRIPTION OF THE INVENTION

The present invention relates to a multi-layered secure device having one or more security keys distributed in one or more memory layers of the device to provide enhanced security. The memory layer is provided on top of a logic layer and form in a monolithic structure so that there would be no exposed wires (or connectors) therebetween. The wires or connectors used to couple the logic layer and the memory layer may be through silicon vias (TSV) or other suitable conductive structures (e.g., vias).

Figure 1:
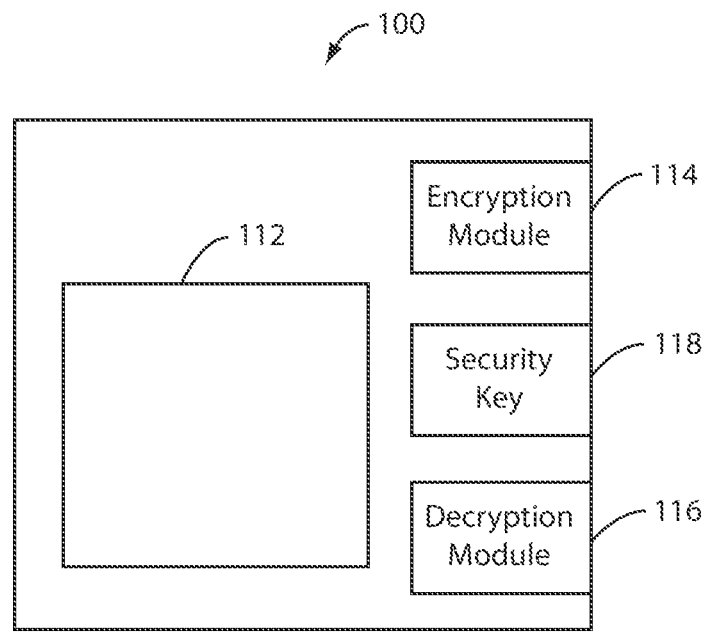
FIG. 1 illustrates a lower layer of an integrated circuit device according to an embodiment of the present invention.

FIG. 1 illustrates an integrated circuit device 100 comprises a plurality of layers according to an embodiment of the present invention. The first, or lowest, layer 110 of an integrated circuit may be an application specific integrated circuit (ASIC), a field programmable gate array (FPGA), a complex programmable logic device (CPLD), a microcontroller (MCU), or other type of circuit that in4terfaces with memory. The circuit may have set logic, such as an ASIC, programmable logic, such as an FPGA or CPLD, or a combination of set and programmable logic.

As shown in FIG. 1, in an embodiment, logic level 110 of an integrated circuit device may include a logic sector 112, an encryption module 114, a decryption module 116, and a security key 118. The presence of the modules and keys may vary according to the encryption implementation. Embodiments include memory embedded in an integrated circuit. In an embodiment, the security key 118 is stored in one or more memory layers that are provided on top of the logic layer, as will be explained in more detail below. Embodiments may also include memory embedded in the logic layer itself.

Figure 2:
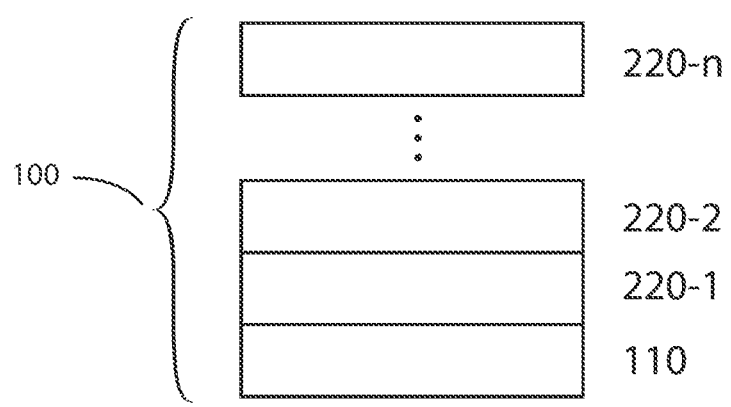
FIG. 2 illustrates a plurality of layers in an integrated circuit device according to an embodiment of the present invention.

FIG. 2 shows an integrated circuit 100 with a plurality of memory layers (220-1 . . . n) disposed over logic level 110. Embodiments may include a first memory layer 220-1, first memory layer 220-1 and second memory layer 220-2, or n memory layers, where n is a whole number. Each memory layer includes non-volatile memory cells, and may include logic components as well. Although an exemplary embodiment is described below with a particular form of non-volatile memory, persons of skill in the art will recognize that various embodiments may include other forms of non-volatile memory.

Figure 3:
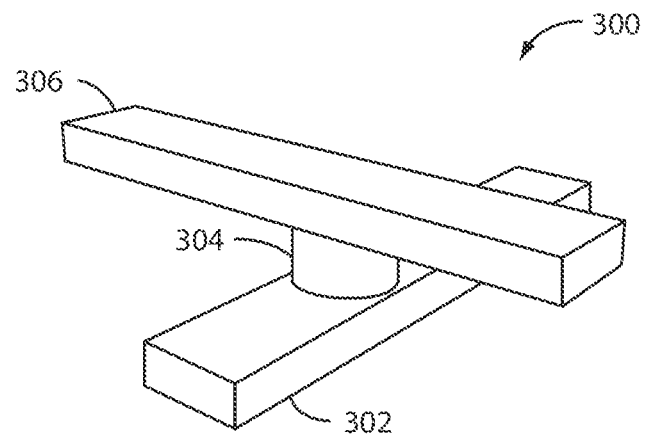
FIG. 3 illustrates a memory cell according to an embodiment of the present invention.

FIG. 3 shows an embodiment of non-volatile memory that may be included in each memory layer 220. As shown in FIG. 3, non-volatile memory 300 includes a bottom electrode 302, a switching medium 304, and a top electrode 306. The switching medium 304 exhibits a resistance that can be selectively set to various values, and reset, using appropriate control circuitry. The memory 300 is two-terminal resistive memory, e.g., a resistive random-access memory (RRAM), in the exemplary embodiment.

The resistive memory device is a two-terminal device having a switching medium provided between top and bottom electrodes. The resistance of the switching medium can be controlled by applying an electrical signal to the electrodes. The electrical signal may be current-based or voltage-based, or may use a combination of current and voltage. As used herein, the term "RRAM" or "resistive memory device" or "resistive memory cell" refers to a memory device that uses a switching medium whose resistance can be controlled by applying an electrical signal without ferroelectricity, magnetization and phase change of the switching medium. Although RRAM is described in greater detail below, embodiments of the present invention may be implemented in various types of two terminal non-volatile memory, such as phase-change memory (PCRAM), ferroelectric memory (FERAM), and magnetic memory (MRAM).

In an embodiment, memory cells 300 use an amorphous-silicon-based resistive memory and use amorphous silicon (a-Si) as the switching medium 304. The resistance of the switching medium 304 changes according to formation or retrieval of a conductive filament inside the a-Si switching medium 304 according to a voltage applied. The top electrode 306 is a conductive layer containing silver (Ag) and acts as a source of filament-forming ions in the a-Si switching medium 304. Although silver is used in an exemplary embodiment, it will be understood that the top electrode 306 can be formed from various other suitable metals, such as gold (Au), nickel (Ni), aluminum (Al), chromium (Cr), iron (Fe), manganese (Mn), tungsten (W), vanadium (V), and cobalt (Co). The bottom electrode 302 is a boron-doped or other p-type polysilicon electrode that is in contact with a lower end face of the a-Si switching medium 304.

Figure 4A:
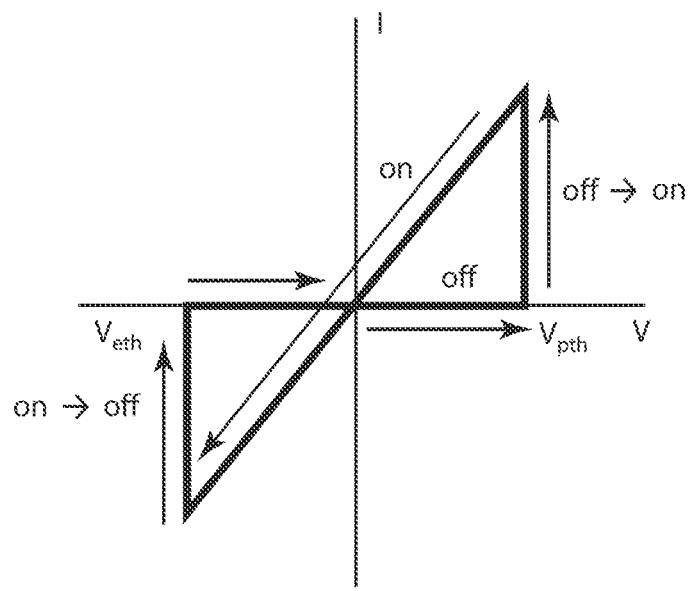
FIGS. 4A and 4B illustrate electrical behavior of a memory cell according to an embodiment of the present invention.

FIG. 4A illustrates resistance switching characteristics of the memory cell 300 according to an embodiment of the present invention. The switching medium 304 displays a bipolar switching mechanism. The resistance of the switching medium 304 changes depending on the polarity and magnitude of a current signal applied to the switching medium 304 via the top and bottom electrodes 306 and 302. The memory cell 300 is changed into an ON-state (low resistance state) when a positive voltage equal to or greater than a program threshold voltage (or program voltage) Vpth is applied. In an embodiment, the program voltage ranges between 1 volt to 5 volts depending on the materials used for the switching medium 304 and the top electrode 306. The memory cell 300 is switched back to an OFF-state (high resistance state) when a negative voltage equal to or greater than an erase threshold voltage (or erase voltage) Veth is applied. In an embodiment, the erase voltage ranges from −1 volts to −5 volts. The device state is not affected if the voltage applied is between the two threshold voltages Vpth and Veth, which enables a low-voltage, read process. Once the memory cell 300 is set to a specific resistance state, the memory cell 300 retains information for a certain period (or retention time) without electrical power.

FIG. 4A illustrates non-rectifying switching characteristics of the memory cell 300 according to an embodiment of the present invention. Electrical current flows from the top electrode 306 to the bottom electrode 302 when the top electrode 306 is applied with a positive potential with respect to the bottom electrode 302. On the other hand, the current flows in a reverse direction if the top electrode 306 is applied with a negative potential with respect to the bottom electrode 302.

Figure 4B:
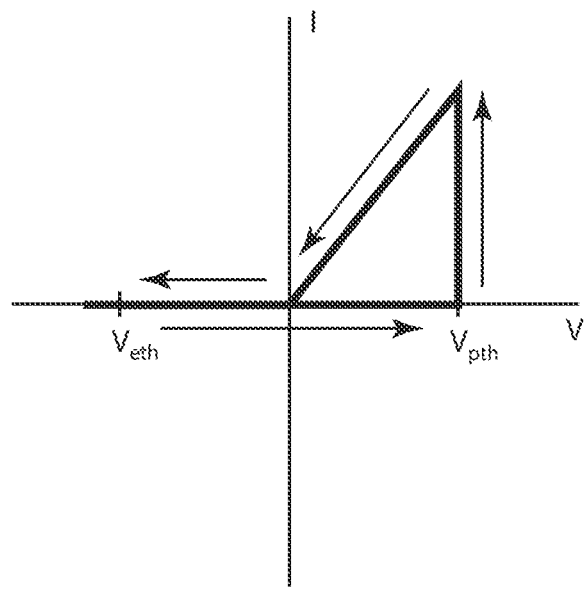

FIG. 4B, on the other hand, illustrates rectifying switching characteristics of the memory cell 300 according to another embodiment of the present invention. Electrical current flows from the top electrode 306 to the bottom electrode 302 when the top electrode 306 is applied with a positive potential with respect to the bottom electrode 302, but the current does not flow in the reverse direction even if the top electrode 306 is applied with a negative potential with respect to the bottom electrode 302. Under this embodiment, the device 300 exhibits a diode-like behavior and can be represented with an equivalent circuit including a resistor connected in series with a diode. The memory cell 300 can be controlled to exhibit either rectifying or non-rectifying characteristics by controlling the amount of current flowing through the device.

Figure 5A:
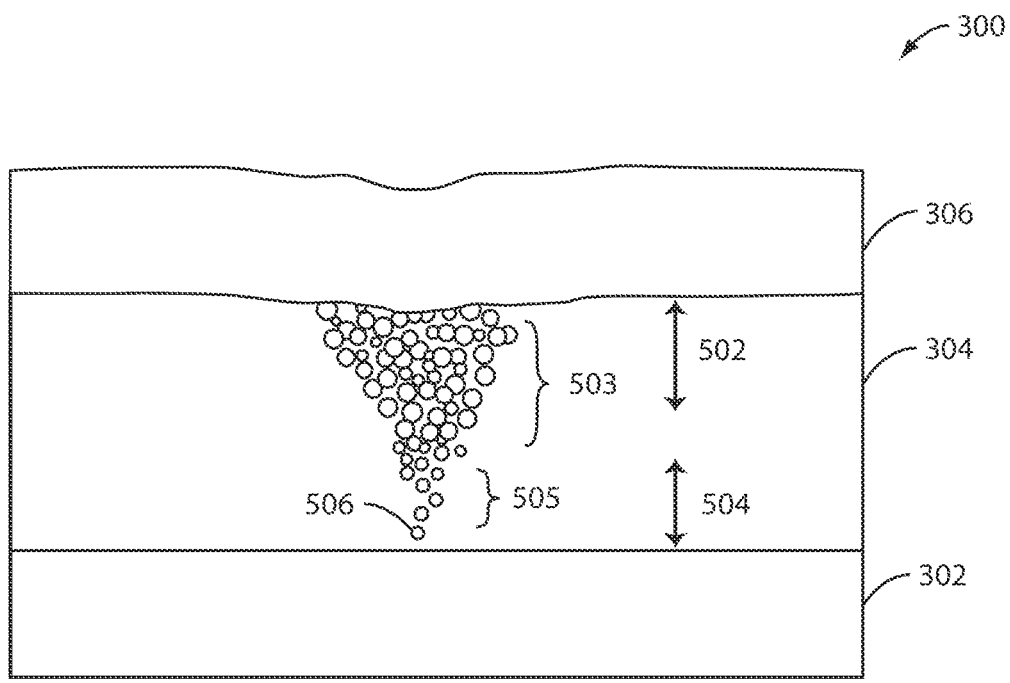
FIGS. 5A and 5B illustrate physical states of a memory cell according to an embodiment of the present invention.
Figure 5B:
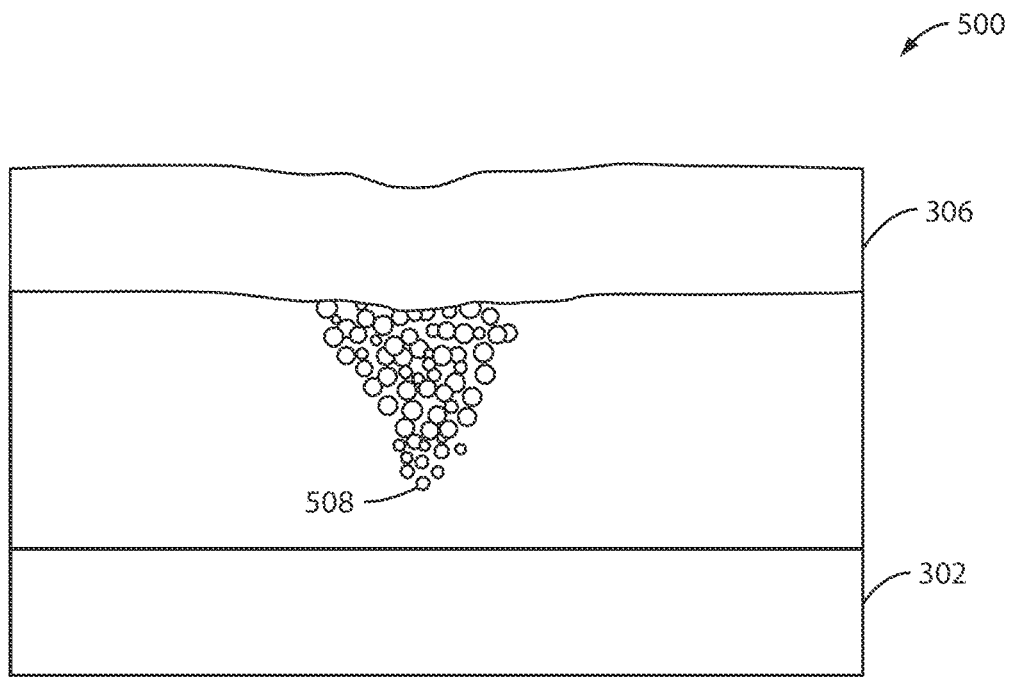

FIGS. 5A and 5B illustrate a switching mechanism of the memory cell 300 during the ON and OFF states according to an embodiment of the present invention. The switching in the a-Si switching medium 304 is based on formation and retrieval of a conductive filament or a plurality of filaments in a filament region in the a-Si switching medium 304 according to the program and erase voltages applied to the electrodes 302 and 306 of the memory cell 300.

FIG. 5A illustrates the device 300 that is placed in the ON state (or programmed state) by applying the program voltage Vpth to the top electrode 306. The switching medium 304 made of a-Si is provided between the bottom electrode 302 and the top electrode 306. An upper portion of the switching medium 304 includes a metallic region (or conductive path) 502 that extends from the top electrode 306 to about 10 nm above the bottom electrode 302. The metallic region 502 is formed during an electroforming process when a slightly larger voltage than a subsequent switching voltage, e.g., 1~5 V, is applied to the top electrode 306. This large voltage causes the electric field induced diffusion of the metal ions from the top electrode 306 toward the bottom electrode 302, thereby forming a continuous conductive path 503.

A lower portion of the switching medium 304 defines a filament region 504 wherein a filament 505 is formed when the program voltage Vpth is applied after the electroforming process. The regions 503 and 505 can be also formed together during the electroforming process. The filament 505 includes a series of metal particles that are trapped in defect sites in the lower portion of the switching medium 304 when the program voltage Vpth applied provides sufficient activation energy to push a number of metal ions from the metallic region 502 toward the bottom electrode 302.

The filament 505 comprises a collection of metal particles that are separated from each other by the non-conducting switching medium and does not define a continuous conductive path, unlike the path 503 in the metallic region 502. The filament 505 extends about 2-10 nm depending on implementation. The conduction mechanism in the ON state is electrons tunneling through the metal particles in the filament 505. The device resistance is dominated by the tunneling resistance between a metal particle 506 and the bottom electrode 302. The metal particle 506 is a metal particle in the filament region 504 that is closest to the bottom electrode 302 and is the last metal particle in the filament region 504 in the ON state.

Referring back to FIGS. 4A and 4B, the memory cell 300 can be controlled to exhibit a diode-like behavior by controlling the amount of current flowing through the memory cell 300. If the amount of current flowing through the memory cell 300 is less than a threshold amount, the device 300 exhibits a diode-like behavior, thereby preventing a reverse current flow from the bottom electrode 302 to the top electrode 306. In an embodiment, the threshold current is 10 µA so that the memory cell 300 exhibits non-rectifying characteristics (see FIG. 4A) if the amount of current is 10 µA or more and rectifying characteristics (see FIG. 4B) if the amount of current is less than 10 µA. The threshold current varies according to the device implementation, e.g., the materials used and the size of the memory cell 300.

A negative potential applied to the bottom electrode 302 causes the metal particle 506 closest to the bottom electrode 302 (see FIG. 5A) to shift slightly upward without dislodging it from the filament region 504. The resulting increased distance between the metal particle 506 and the bottom electrode 302 increases the resistance and prevents the current from flowing from the bottom electrode 302 to the metal particle 506. If the current, however, is equal to or greater than the threshold level, the large current bursts through the metal particle 506 from the bottom electrode 302.

Figure 6:
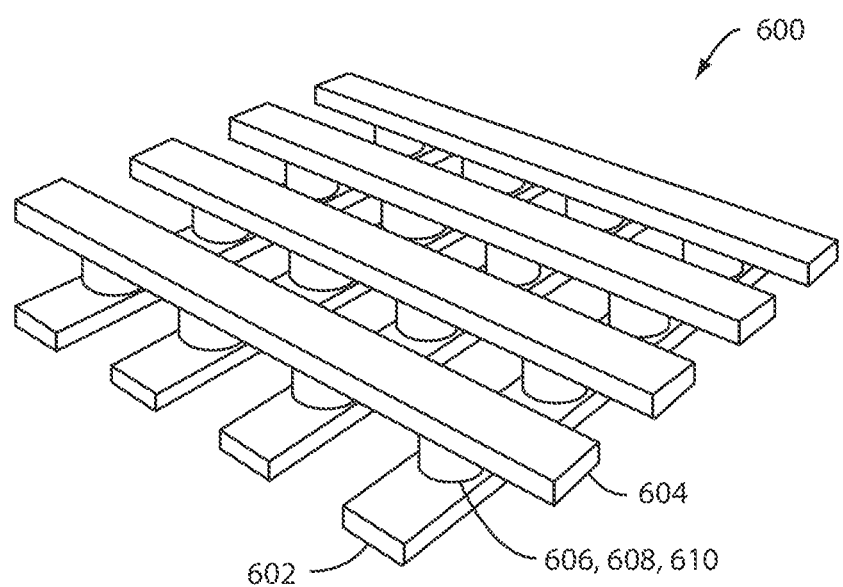
FIG. 6 illustrates a memory array according to an embodiment of the present invention.

FIG. 6 illustrates a non-crystalline or a-Si based crossbar memory array 600 according to an embodiment of the present invention. The crossbar memory array 600 includes a parallel array of bottom electrodes 602 extending along a first direction. In an embodiment, the bottom electrodes 602 include a bottom metal (not shown) and a p-type polysilicon (not shown) formed on the bottom metal. The bottom electrodes 602 are nanoscale in an embodiment. For example, the bottom electrodes 602 may have a width of about 40 nm and a pitch of about 80 nm.

A parallel array of top electrodes 604 extends along a second direction to intersect the bottom electrodes 602. The top electrodes 604 include metals capable of supplying filament-forming ions such as silver (Ag), gold (Au), nickel (Ni), aluminum (Al), chromium (Cr), iron (Fe), manganese (Mn), tungsten (W), vanadium (V) and cobalt (Co). In an embodiment, the top electrodes 604 and the bottom electrodes 602 are orthogonal to each other. The top electrodes 604 are nanowires having a width of about 60 nm and a pitch of about 120 nm.

Each intersection 606 of the two arrays 602 and 604 defines a two-terminal resistive memory cell 608. The memory cell 608 at each intersection 606 includes two electrodes 602 and 604 separated by a switching layer 610. The switching layer or structure can have a width substantially the same as or narrower than that of the bottom electrode 602. In some embodiments, each memory cell in a crossbar memory array can store a single bit. In other embodiments, the memory cells exhibit multi-level resistance thereby allowing storage of a plurality of bits at each cell. In an embodiment, the switching layer 610 includes amorphous silicon or other non-crystalline silicon, but embodiments of the invention are not limited thereto.

In an embodiment, referring to FIG. 2, memory layers 220 are electrically coupled to logic layer 110 and to other memory layers 220 by through silicon vias (TSVs). To enhance thermal performance, the memory cells of memory layers 220 may be disposed towards outer edges of the chip, so that memory cells are not directly disposed over logic components. Each successive memory layer 220 may be arranged in such a manner, so that a portion of upper memory layers does not overlap with portions of lower memory layers.

In an embodiment where memory layers 220 only store keys and a relatively small amount of data or no data, memory cells storing one or more key 118 may be distributed across relatively large areas of the underlying circuit 100. A broad distribution of memory cells can help obscure the location of a key, especially when multiple keys are present.

Figure 7:
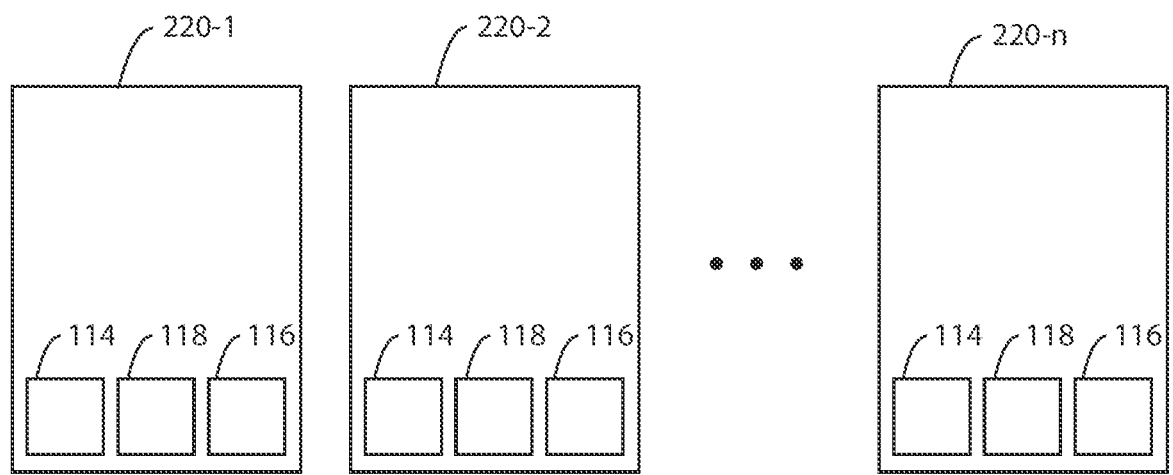
FIG. 7 illustrates a plurality of memory layers according to an embodiment of the present invention.

Referring to FIG. 7, one or more memory layer 220 may include an encryption module 114, a decryption module 116, and a security key 118. Alternatively, each memory layer

220 may include a security key 118, but not an encryption module 114 or decryption module 116.

Figure 8A:
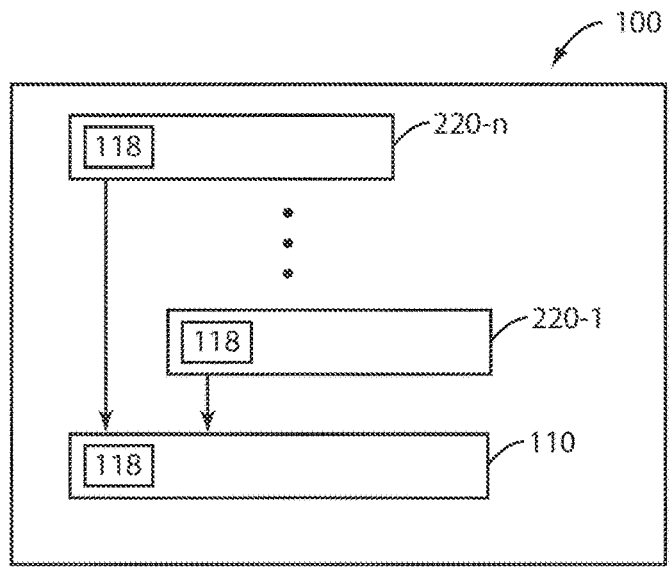
FIGS. 8A to 8C illustrate memory and logic layers according to various embodiments of the present invention.

FIG. 8A illustrates the integrated circuit device 100 having logic layer 110 and one or more memory layers 220 disposed over the logic layer according to an embodiment of the present invention. Device 100 may include a single memory layer 220-1 having a security key 118 that is retrieved by logic layer 110 to unlock the device 100 for operation. Alternatively, the device 100 may include a plurality of security key 118 that are provided on different memory layers 220, and the device 100 determines which security key to use for unlocking the device. The security key 118 for unlocking may be selected randomly or in a predetermined sequence.

The one or more security key 118 in a memory layer 220 may be set at any phase of its lifecycle. The key could be set during the fabrication process, for example by setting memory states at or immediately following fabrication. In some applications, it may be desirable for the security key to be set by a customer further down the supply chain, such as an original equipment manufacturer, a reseller, or even an end user.

The security key 118 can be set by using a one-time programmable (OTP) process. An example of OTP process is an anti-fuse process, which is well known. In an embodiment, a memory layer 220 includes a large number of potential antifuse locations, so that it is difficult to determine which anti-fuses have been activated in a particular application through imaging techniques.

In an embodiment, a plurality of security keys 118 that are distributed on different memory layers 220-1 to 220-n may include "dummy" keys that are not used by the device 100, but are provided to make it more difficult to determine which security key is used by the device 100.

Figure 8B:
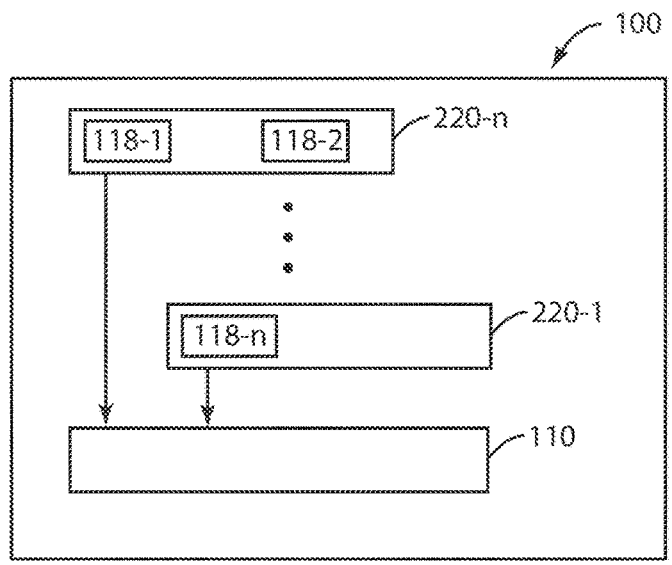

FIG. 8B illustrates a security key 118 having a plurality of components that are distributed in a plurality of memory layers 220 according to an embodiment of the present invention. These components are put together by the logic 110 and the device 100 can be unlocked only if the all the components are safely brought together by the logic 100. If any one of the key component is destroyed by a reverse engineering effort, the device 100 could not be unlocked. For example, if the security key 118 uses a 256-bit key, the key can be divided into four 64-bit key components 118-1 to 118-4 and stored in four different memory layers 220. Alternatively, more than one key component may be stored on different locations of a given memory layer 220.

Figure 8C:
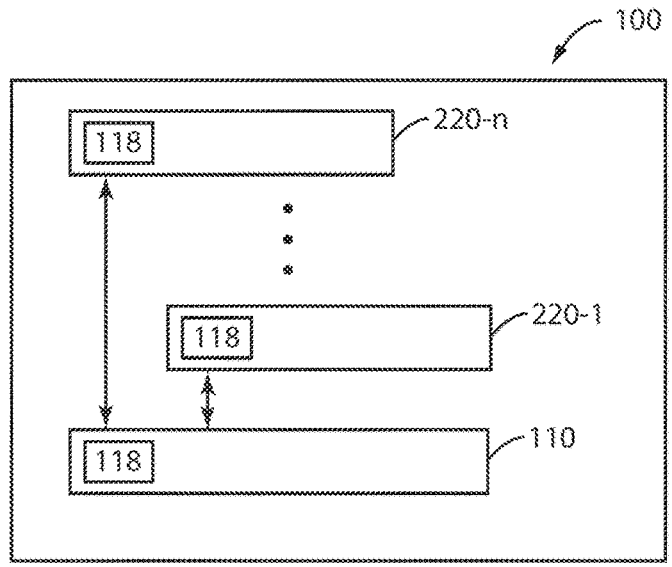

In an embodiment, data are in the memory layers 220 are encrypted using keys as shown in FIG. 8C. Symmetrical keys are used to encrypt the data transmission, where one or more key 118 disposed on logic layer 110 corresponds to one or more key 118 disposed on memory layers 220. Alternatively, the keys 118 may all be stored in the memory layers 220.

The keys 118 could be distributed among the memory layers 220 in a convoluted fashion to further obscure key values and locations. For example, the key 118 used by logic layer 110 to decrypt data from memory layer 220-1 may be stored on memory layer 220-2, or portions of each key may be distributed among several memory layers as discussed above with respect to FIG. 8B. Having a plurality of keys present in various forms and layers enhances the difficulty of reverse engineering a circuit 100.

Any number of encryption schemes may be used by embodiments of the present invention. For example, the device 100 may use the data encryption standard (DES) or the advanced encryption standard (AES) with one or more keys 118 of an arbitrary length. Embodiments can implement symmetric key or asymmetric keys as appropriate. Embodiments of the present invention are not limited to any particular length or encryption scheme.

Different encryption schemes can be used in the same device 100 for different purposes. For example, external communications may use AES, while internal storage may be encrypted with DES.

In an embodiment, the device 100 includes a field programmable gate array (FPGA) so that the logic can be configured after the circuit is fabricated. The logic configuration of an FPGA is stored (programmed) in a memory, and is loaded into the logic when power is applied to the circuit. This communication may involve a bit stream up to millions of bits, depending on the complexity of the logic. In a secure implementation, these bits are encrypted.

Device 100 having memory layers 220 with one or more security keys 118 provides enhanced security compared to a conventional FPGA device. In such a conventional FPGA device, the memory is disposed in a separate module from the logic so that the wiring between the logic and the memory is exposed and vulnerable to monitoring by a reverse engineer. The device 100, on the other hand, does not have any exposed wires between the logic layer 110 and the memory layer 220 since the latter is formed on top of the logic layer 110.

In addition to providing secure intra-chip communications, an embodiment that uses an FPGA as a lower layer 110 can store keys 118 for communication with external devices. Embodiments described above with respect to FIGS. 1-8 can be implemented using an FPGA as a logic layer 110.

The present invention is not restricted to a particular configuration of the logic layer 110. As circuit technology progresses, the line between an ASIC, an FPGA, and other similar set or programmable circuits blurs as hybrid devices enter the market. Any of these circuits can implement security through one or more memory layers 220 as described herein.

Figure 9:
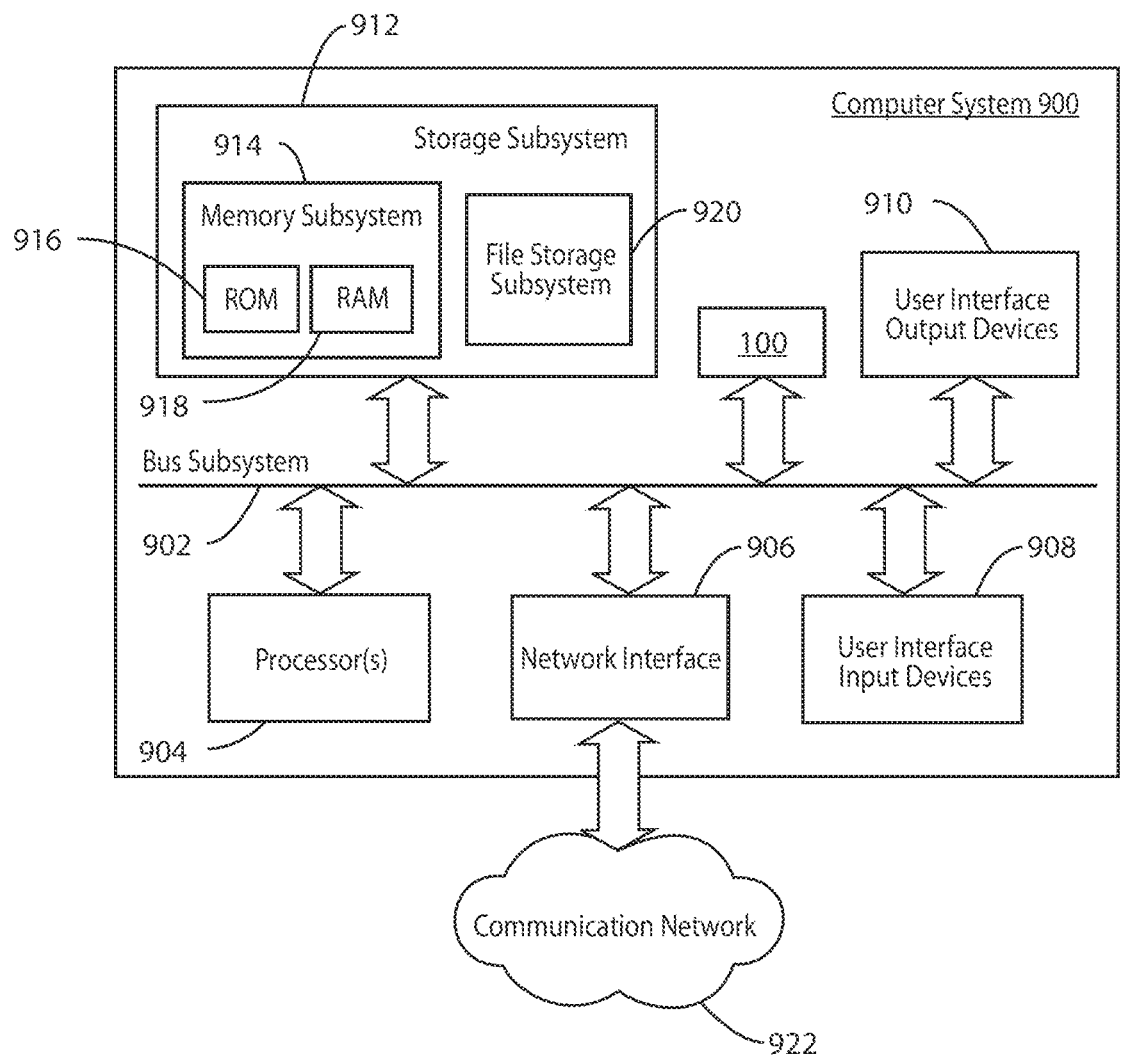
FIG. 9 illustrates a computer system according to an embodiment of the present invention.

A system employing a circuit device 100 as described above may be implemented in many different configurations. In one embodiment, as shown in FIG. 9, the device 100 is implemented in a computer system 900. Although FIG. 9 shows device 100 as being discrete from computer subsystems, it can be implemented as a component of any of the subsystems or other components, such as storage subsystem 912, network interface 906, or user interface output devices 908.

FIG. 9 is a simplified block diagram of an exemplary computer system 900 according to an embodiment of the present invention. Computer system 900 typically includes at least one processor 904, which communicates with a number of peripheral devices via bus subsystem 902. These peripheral devices typically include a storage subsystem 912, comprising a memory subsystem 914 and a file storage subsystem 920, user interface input devices 910, user interface output devices 908, and a network interface subsystem 906. The input and output devices allow user interaction with computer system 900. It should be apparent that the user may be a human user, a device, a process, another computer, and the like. Network interface subsystem 906 provides an interface to outside networks, including an interface to communication network 922, and is coupled via communication network 922 to corresponding interface devices in other computer systems.

User interface input devices 910 may include a keyboard, pointing devices such as a mouse, trackball, touchpad, or graphics tablet, a scanner, a barcode scanner for scanning article barcodes, a touchscreen incorporated into the display, audio input devices such as voice recognition systems, microphones, and other types of input devices. In general, use of the term "input device" is intended to include all possible types of devices and ways to input information into computer system 900 or onto communication network 922.

User interface output devices 908 may include a display subsystem, a printer, a fax machine, or non-visual displays such as audio output devices. The display subsystem may be a cathode ray tube (CRT), a flat-panel device such as a liquid crystal display (LCD), or a projection device. The display subsystem may also provide non-visual display such as via audio output devices. In general, use of the term "output device" is intended to include all possible types of devices and ways to output information from computer system 900 to a user or to another machine or computer system.

Storage subsystem 912 stores the basic programming and data constructs that provide the functionality of the computer system. For example, the various modules implementing the functionality of the present invention may be stored in storage subsystem 912. These software modules are generally executed by processor(s) 904. In a distributed environment, the software modules may be stored on a plurality of computer systems and executed by processors of the plurality of computer systems. Storage subsystem 912 also provides a repository for storing the various databases storing information according to the present invention. Storage subsystem 912 typically comprises memory subsystem 914 and file storage subsystem 920.

Memory subsystem 914 typically includes a number of memories including a main random access memory (RAM) 918 for storage of instructions and data during program execution and a read only memory (ROM) 916 in which fixed instructions are stored. File storage subsystem 920 provides persistent (non-volatile) storage for program and data files, and may include a hard disk drive, a floppy disk drive along with associated removable media, a Compact Digital Read Only Memory (CD-ROM) drive, an optical drive, removable media cartridges, and other like storage media. One or more of the drives may be located at remote locations on other connected computers at another site on communication network 922.

Bus subsystem 902 provides a mechanism for letting the various components and subsystems of computer system 900 communicate with each other as intended. The various subsystems and components of computer system 900 need not be at the same physical location but may be distributed at various locations within a distributed network. Although bus subsystem 902 is shown schematically as a single bus, alternative embodiments of the bus subsystem may utilize multiple busses.

Computer system 900 can be of varying types including a personal computer, a portable computer, a workstation, a computer terminal, a network computer, a mainframe, a handheld communication device, or any other data processing system. Due to the ever-changing nature of computers and networks, the description of computer system 900 depicted in FIG. 9 is intended only as a specific example for purposes of illustrating the computer system. Many other configurations of a computer system are possible having more or fewer components than the computer system depicted in FIG. 9. Client computer systems and server computer systems generally have the same configuration as shown in FIG. 9, with the server systems generally having more storage capacity and computing power than the client systems.

Figure 10:
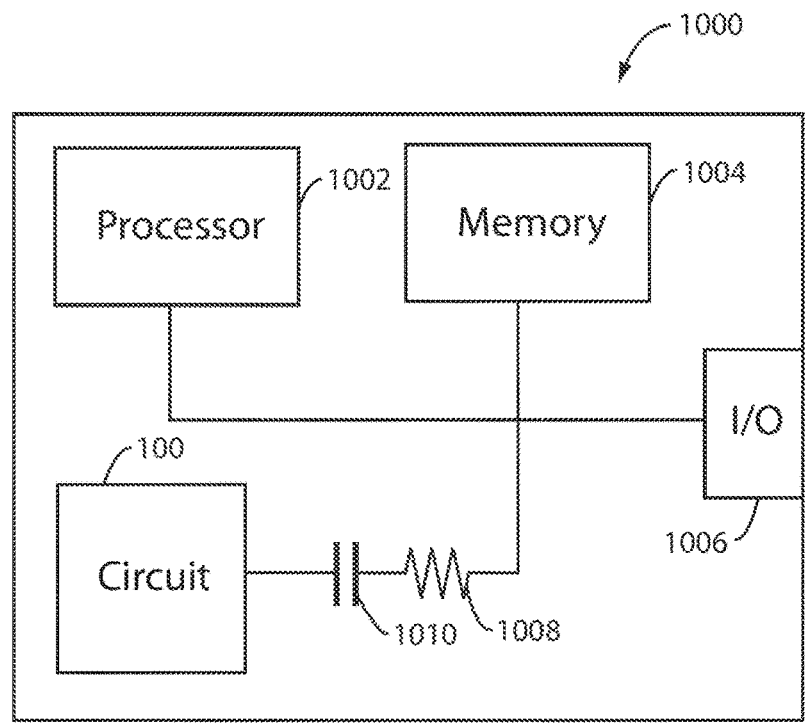
FIG. 10 illustrates a packaged device according to an embodiment of the present invention.

Another example of a system which may incorporate device 100 is a packaged device 1000, as shown in FIG. 10. Packaged device 1000 may include one or more processors 1002, memory 1004, I/O port 1006, and electrical components such as a resistor 1008 and a capacitor 1010. The I/O port 1006 may be a typical interface such as a universal serial bus (USB), a proprietary interface, or the like. In some embodiments, the interface may use light or radio waves to transmit data into and out of the system in a package 1000. A system in a package 1000 may be incorporated along with other components into a device such as a computer system 900 or another electronic device.

Figure 11:
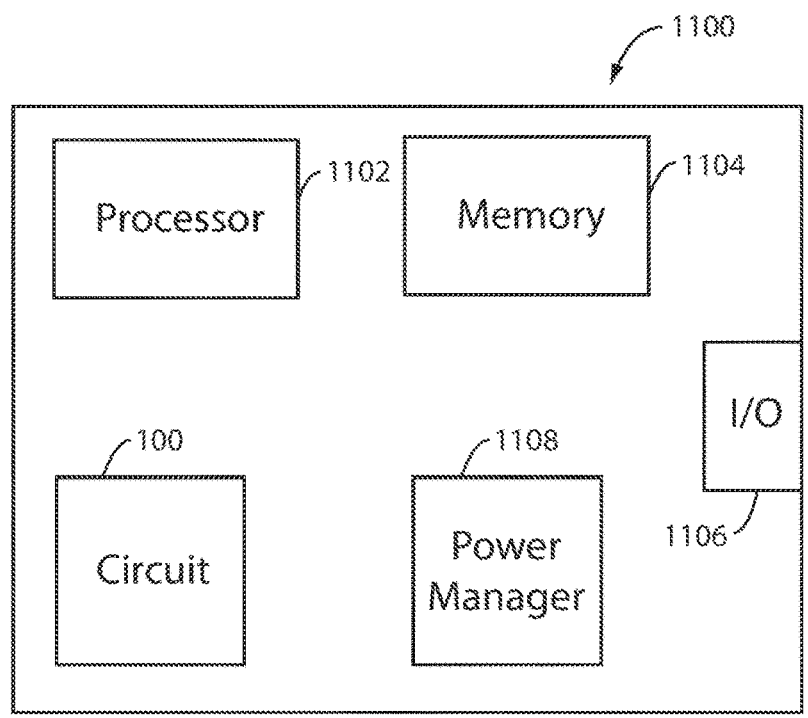
FIG. 11 illustrates a system on a chip according to an embodiment of the present invention.

Yet another example of a system which may incorporate device 100 is a system on a chip 1100, as shown in FIG. 11. A system on a chip may comprise one or more processor 1102, memory 1104, I/O interface 1106, and power management module 1108, all integrated into a single chip. Persons of skill in the art will recognize that various embodiments of a system on a chip 1100 may have more or less components than those shown in FIG. 11. Various components may be disposed on the same layer, or stacked above one another on separate layers.

Embodiments according to the present disclosure have advantages over conventional devices. For example, certain security functions may be made redundant by a multilayered secure device 100. An exemplary function that may be made redundant is a checksum operation that is conducted for security purposes, particularly in telecom applications. Although a checksum operation may still be performed to ensure data accuracy, in an embodiment, it may not be necessary to perform a checksum to determine whether a device has been compromised. Eliminating such functions may reduce the cost and complexity of devices according to the above disclosure, as well as reducing boot and transmission times.

An exemplary embodiment comprising a plurality of memory layers 220, each comprising a security key 118 or security key portion 118-n, makes it considerably more difficult to reverse engineer a circuit 100. To accurately image the lower logic level 110, a reverse engineer etches upper memory layers 118-1 to 118-n, thereby destroying security keys 118 and any additional data stored in memory. With the security keys destroyed, the device will not function, making it more difficult to image operations of the logic layer 110.

Persons of skill in the art will recognize these and other advantages. Although the invention has been described using structures of exemplary embodiments, embodiments of the invention are not necessarily limited thereto. The above description is intended to be illustrative, and not limiting.

What is claimed is:

1. A secure semiconductor chip, comprising:
   a logic layer that comprises access logic and a logic circuit formed within the logic layer;
   a first memory layer comprising non-volatile resistive memory cells disposed over the logic layer and integrated with the logic layer in a monolithic structure embodying the secure semiconductor chip; and
   a plurality of connectors within vias provided between the logic layer and the first memory layer facilitating intra-chip communication within an interior of the secure semiconductor chip; wherein:
     the access logic is configured to receive a security key stored in non-volatile resistive memory cells of the first memory layer by way of the plurality of connectors, and the access logic is configured to provide access to the logic circuit formed within the logic layer in response to successfully receiving the security key.

2. The secure semiconductor chip of claim 1, wherein the security key comprises:
   a first security key portion disposed in a first group of the non-volatile resistive memory cells in a first location of the first memory layer; and
   a second security key portion disposed in a second group of the non-volatile resistive memory cells in a second location of the first memory layer, wherein the first location and the second location are different locations of the first memory layer.

3. The secure semiconductor chip of claim 2, wherein the access logic:
   retrieves the first security key portion from the first group of the non-volatile resistive memory cells in the first location,
   retrieves the second security key portion from the second group of the non-volatile resistive memory cells in the second location, and
   recombines the first security key portion and the second security key portion to from the security key to facilitate receiving the security key stored in the first memory layer.

4. The secure semiconductor chip of claim 2, wherein the access logic utilizes:
   the second security key portion to unlock the first security key portion, and
   the unlocked first security key portion as the security key to provide access to the logic circuit.

5. The secure semiconductor chip of claim 1, wherein the plurality of connectors within vias are not exposed to an exterior of the monolithic structure.

6. The secure semiconductor chip of claim 1, wherein the security key is stored in the non-volatile resistive memory cells of the first memory layer immediately following fabrication utilizing a one-time programmable (OTP) process.

7. The secure semiconductor chip of claim 1, further comprising an interface, wherein the security key is stored in the non-volatile resistive memory cells of the first memory layer post-fabrication in response to an input received at the interface.

8. The secure semiconductor chip of claim 1, wherein the first memory layer stores a dummy security key that are not used by the secure semiconductor chip.

9. The secure semiconductor chip of claim 8, wherein the access logic is configured to reject access to the logic circuit in response to receiving the dummy security key.

10. The secure semiconductor chip of claim 1, further comprising a second security key stored on the logic layer, wherein the security key and the second security key facilitate encryption of data to form encrypted data and decryption of the encrypted data.

11. The secure semiconductor chip of claim 10, wherein the encrypted data is stored in the first memory layer.

12. The secure semiconductor chip of claim 10, further comprising a second memory layer formed overlying the first memory layer and the logic layer as part of the monolithic structure, wherein at least one of the plurality of connectors within vias is provided between the logic layer and the second memory layer, and wherein the encrypted data is stored at the second memory layer.

13. A system embodied on a secure semiconductor chip, comprising:
   a monolithic structure comprising a plurality of layers, the plurality of layers including:
      a logic layer comprising an access logic and a logic circuit;
      a memory layer overlying the logic layer comprising non-volatile memory;
      a connector between the logic layer and the memory layer that electrically couples the logic layer and the memory layer providing secure intra-chip communication there between; and
   a security key stored in the non-volatile memory of the memory layer, wherein the access logic is configured to retrieve the security key from the non-volatile memory utilizing the connector and the intra-chip communication in conjunction with permitting access to the logic circuit of the logic layer.

14. The system of claim 13, further comprising an interface facilitating communication between the system and an external device.

15. The system of claim 14, wherein the logic circuit comprises a programmable circuit configurable after fabrication of the secure semiconductor chip and at least in part by way of the interface.

16. The system of claim 14, wherein the interface comprises a network interface, a user interface input device or a user interface output device.

17. The system of claim 15, wherein a logic configuration of the programmable circuit is stored in the memory layer.

18. The system of claim 17, wherein the logic configuration of the programmable circuit is loaded into the programmable circuit from the memory layer by way of the connector and the intra-chip communication there between, and wherein the logic configuration loaded from the memory layer to the programmable circuit is an encrypted bit stream.

19. The system of claim 13, wherein the system embodied on the secure semiconductor chip is a system on a chip and further comprises a processor and a power manager.

20. The system of claim 19, wherein the processor and the power manager are disposed on the logic layer of the monolithic structure, the memory layer of the monolithic structure, or a third layer disposed overlying the logic layer of the monolithic structure.

* * * * *